United States Patent
Singer et al.

(10) Patent No.: US 9,262,686 B1
(45) Date of Patent: Feb. 16, 2016

(54) PRODUCT IMAGE INFORMATION EXTRACTION

(71) Applicant: Amazon Technologies, Inc., Reno, NV (US)

(72) Inventors: Derek Cole Singer, Seattle, WA (US); Sunil Ramesh, San Jose, CA (US); Sebastian Lehmann, Seattle, WA (US); Andrea C. Steves, Seattle, WA (US); Nathan John Condie, Lindon, UT (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/148,109

(22) Filed: Jan. 6, 2014

Related U.S. Application Data (62) Division of application No. 13/540,239, filed on Jul. 2, 2012, now Pat. No. 8,639,036.

(51) Int. Cl.
*G06K 9/46* (2006.01)

(52) U.S. Cl.
CPC .................................. *G06K 9/4604* (2013.01)

(58) Field of Classification Search
CPC ................... G06T 2207/30128; G06K 9/4638; G06K 9/342; G06K 9/00; G06K 9/18; G06K 9/186; G06K 9/228; G06K 9/183; G06K 9/2054; G06K 2209/01; G06K 7/14; G06K 1/121
USPC .................................. 382/181, 182, 184, 100
See application file for complete search history.

(56) References Cited

U.S. PATENT DOCUMENTS

| | | | |
|---|---|---|---|
| 2007/0133874 A1* | 6/2007 | Bressan et al. | 382/181 |
| 2010/0226563 A1* | 9/2010 | Takayama et al. | 382/154 |
| 2012/0134590 A1* | 5/2012 | Petrou et al. | 382/182 |
| 2013/0153662 A1* | 6/2013 | Narasa Prakash | 235/462.07 |

* cited by examiner

*Primary Examiner* — Edward Park
(74) *Attorney, Agent, or Firm* — Lowenstein Sandler LLP (57) ABSTRACT

A system and method for receiving an image of a product's packaging and extracting information (e.g., a set of facts) associated with a product from the image. The extracted information associated with the product may be added to a product profile if a confidence score associated with the extracted information is greater than or equal to a threshold.

18 Claims, 4 Drawing Sheets

PRODUCT IMAGE INFORMATION EXTRACTION

REFERENCE TO RELATED APPLICATION

This application is a divisional of U.S. patent application Ser. No. 13/540,239, filed Jul. 2, 2012, the entirety of which is hereby incorporated herein by reference.

BACKGROUND

The expansion of electronic commerce has resulted in an increase in the size and sophistication of online product catalogs. Typically, a vendor provides a description and set of details associated with products presented in the catalog by manually entering the product data. In certain instances involving online marketplaces hosting multiple third party vendors, the vendors provide only partial information to the marketplace. Meanwhile, in traditional brick and mortar stores, customers generally have only the information on a product's package to make a purchasing decision, and as a result, the product packages typically contain a wealth of information, as compared to the information available at an e-commerce website.

Furthermore, Government agencies may require e-commerce websites to provide more accurate and complete item data to customers. For example, in the United States, the Environmental Protection Agency and Federal Trade Commission may require the display of certain product certifications to customers on the product detail pages. These certifications, such as Energy Star, USDA Organic, and Fair Trade, are frequently indicated on the product's physical packaging by specific logos or labels.

In another example, regulators may require that e-commerce websites display nutrition information and ingredients for consumable products. Generally, nutrition information (e.g., a set of facts or ingredients) is required to be displayed on the packaging for any such items, with the nutrition facts typically being displayed in a standardized tabular format.

In addition, online customers demand for more complete product data is increasing. For example, a customer may be concerned about items that contain specific allergens in the ingredients or that adhere to certain dietary standards (e.g., a kosher diet) for which there are several certification logos. In another example, many customers are also becoming increasingly concerned about toys and baby products that contain potentially harmful chemicals, such as BPAs, phthalates, and phosphates. In yet another example, a customer may be interested in a rating associated with a video game or a DVD movie to determine whether the game or movie is suitable or age appropriate.

BRIEF DESCRIPTION OF DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION

A system and method for receiving an image of a product's packaging and extracting a set of information associated with a product from the image. The extracted information associated with the product may be stored in an attribute data store and used to populate an online catalog. In an example, the information may include one or more facts or attributes associated with the product.

In embodiments, one or more labels are extracted from the image. As used herein, a label may be any suitable identifier of information associated with a product, such as, for example, a graphic, text, image, picture, mark, marking, logo, etc. In an embodiment, the label may represent a certification, seal, rating, and/or approval associated with the product, such as, for example, Energy Star®, USDA Organic, and Fair Trade Certified™. In an embodiment, the product image may be reviewed in accordance with an image matching process in order to identify a potential match between a component of the image and a stored set of labels (e.g., a set of previously identified labels associated with certifications).

In embodiments, one or more text segments may be extracted from the product image. A text segment refers to any text-based string of characters included in the product image, and may include any number of characters, words, phrases, or terms. In an embodiment, the one or more text segments are extracted via optical character recognition (OCR). The extracted output or text segment may be assigned a confidence score (also referred to as an "extraction confidence score") representing a measure of the confidence associated with the certainty or accuracy of the text segment as extracted from the product image.

In embodiments, the one or more extracted text segments are parsed to identify one or more information components. As used herein, an "information component" refers to any character, word, term, phrase, and/or expression representing information, facts and/or attributes associated with the product that are to be displayed to a customer in connection with a catalog entry associated with the product. Exemplary information components may include nutritional information (e.g., calories, protein, carbohydrates), environmental features (e.g., biodegradable, compostable), specifications, features, requirements, compliance information, and safety information.

According to embodiments, the one or more information components are assigned an information confidence score, and if the associated information confidence score is above a threshold, the information component is added to an attribute data store. The attribute data store may be used as source of information when generating product-related catalog entries.

Figure 1:
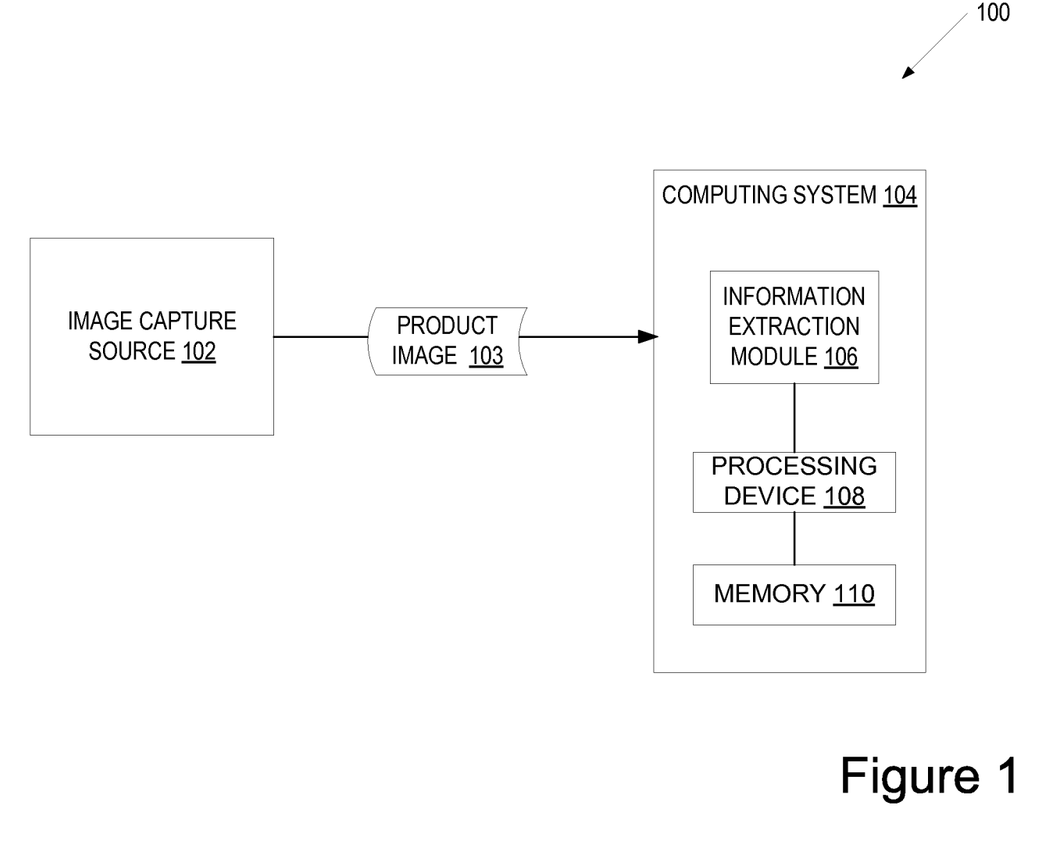
FIG. 1 illustrates a block diagram of an exemplary computing environment including an information extraction module, according to embodiments of the present disclosure.

FIG. 1 is a block diagram of an exemplary computing environment 100 including a computing system 104 configured to implement an information extraction module 106, according to embodiments of the present invention. As shown in FIG. 1, the information extraction module 106 is configured to receive one or more product images 103 from an image capture source 102. In an embodiment, the product image 103 may be received by the computing system 104 executing the information extraction module 106 via a network (not shown), such as, for example, a public network such as the Internet, a private network such as a local area network (LAN), or a virtual private network (VPN).

The image capture source 102 may be any suitable computing device (e.g., a server computer or a desktop computer), a data store (e.g., a database), a vendor, a catalog, an imaging device (e.g., a semi-automated photo studio device, an automated imaging device, etc.) and/or image capture device (e.g., a camera) configured to store and/or capture one or more product images. In an exemplary embodiment, the image capture source 102 may be an imaging device located at a product warehouse or fulfillment center. In an embodiment, the image capture source 102 may include multiple image sources. For example, the product image may include multiple sub-images associated with one or more products. In this example, the multiple sub-images associated with the one or more products may be received from separate, independent sources, such as an existing catalog, a vendor, and an image capture device.

According to embodiments of the present invention, the product image 103 associated with a product may include multiple individual images or perspectives (e.g., sub-images) of the product and the product's packaging (e.g., a six-sided image of the product). The product image 103 may be in any suitable digital format, such as, for example, JPEG, TIFF, RAW, PNG, GIF, BMP, and the like.

In an embodiment, the information extraction module 106 is a software component or application (e.g., a set of instructions residing in memory 110) executable by a processing device 108 (e.g., a processor) configured to extract information components from a product image 103 and facilitate storage of the extracted information components in an attribute data store.

In an embodiment, the information extraction module 106 may be hosted by a computing system 104 (e.g., a server, a desktop computer, a portable digital assistant, a mobile phone, a laptop computer, a portable media player, a tablet computer, a netbook, a notebook, or a personal computer). The computing system 104 may include a processing device 108 and a memory 110. The memory 110 may be any suitable memory or data storage location, including a non-transitory computer readable storage medium, such as, but not limited to, any type of database, disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions. According to embodiments of the present invention, the graph model data store 114 may reside in any suitable location accessible by the graph model generator 106, including, for example, in a network or cloud environment (as illustrated by dashed cloud representation in FIG. 1).

In an embodiment, the processing device 108 and memory 110 may be the local processing device and memory of the information extraction module 106. In another embodiment, the information extraction module 106 may be installed on a computing device from any suitable non-transitory computer-readable storage medium or via network (e.g., by a download). It is noted that any suitable arrangement may be employed such that the information extraction module 106 may perform the functions described in detail below in connection with FIGS. 2 and 3.

Figure 2:
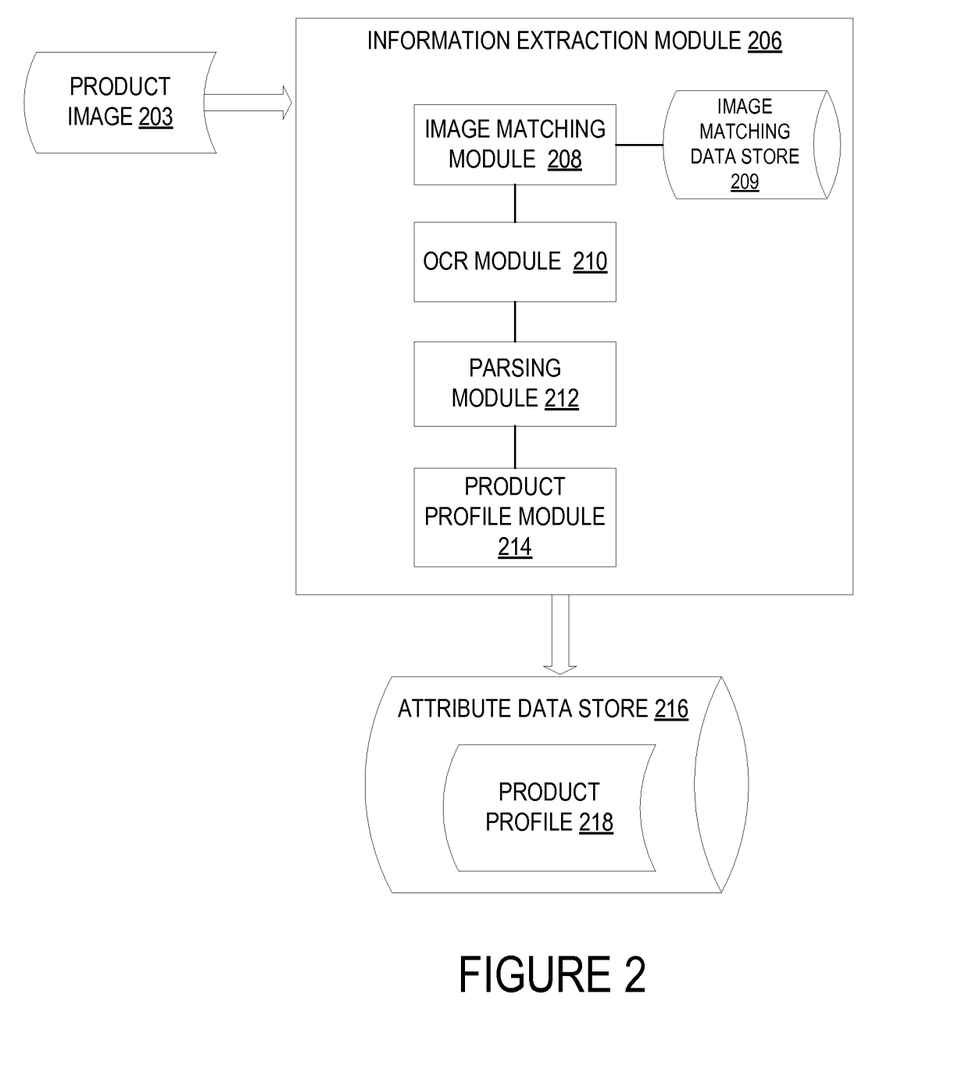
FIG. 2 illustrates an exemplary information extraction module, according to embodiments of the present disclosure.

FIG. 2 illustrates a block diagram of an exemplary information extraction module 206, according to embodiments of the present invention. As shown, the information extraction module 206 may be configured to include an image matching module 208, an optical character recognition (OCR) module 210, a parsing module 212 and a product profile module 214. Although schematically shown in FIG. 2 as separate modules, the illustrated modules may be implemented as a single module or any number of modules configured to perform the actions and functions of the information extraction module 106 described herein.

As shown in FIG. 2, the information extraction module 206 receives and processes a product image 203 to identify one or more information components and/or labels associated with the product for inclusion in an attribute data store 216. In an embodiment, the one or more information components and/or labels associated with a particular product may be maintained in the attribute data store 216 in a product profile 218 associated with the product. In an embodiment, the attribute data store 216 may be accessed in order to retrieve a product profile for purposes of generating a catalog entry or other product description associated with the product.

In an embodiment, the image matching module 208 is a software component or application (e.g., a set of instructions residing in memory, such as the image matching data store 209 shown in FIG. 2) executable by a processing device (e.g., processing device 108 in FIG. 1) configured to receive a product image 203 and perform image matching in order to identify one or more labels associated with the product. A label may be any suitable identifier of information associated with a product, such as, for example, a graphic, text, image, picture, mark, marking, logo, etc. In an embodiment, the label may represent a certification, seal, rating, and/or approval associated with the product, such as, for example, Energy Star®, USDA Organic, and Fair Trade Certified™. In an embodiment, the image matching module 208 is configured to execute suitable computer vision algorithms, such as scale invariant feature transforms, to detect embedded labels in the product image 203 based on a comparison with a previously defined set of labels. The image matching module 208 maps one or more possible matches to an identified label (e.g., product ABC has a label indicating certification X). In an embodiment, the image matching module 208 may assign a label confidence score to each of the one or more identified labels (e.g., a measure indicating the accuracy or certainty of the label match). In one embodiment, the image matching module 208 may be configured to implement SnapTell image matching technology manufactured by A9™. In an embodiment, the product image 203 is cropped into multiple pieces which are compared against one or more reference labels stored in the image matching data store 209 in order to identify one or more label matches. Any suitable cropping program or tool may be used in accordance with embodiments of the present invention, such as, for example, Image Magick®.

As shown in FIG. 2, in an embodiment, the OCR module 208 is a software component or application (e.g., a set of instructions residing in memory, such as memory 110 in FIG. 1) executable by a processing device (e.g., processing device 108 in FIG. 1) configured to perform optical character recognition to extract text from the product image 203. In an embodiment, the OCR module 208 identifies one or more text segments associated with the product image 203. A text segment refers to any text-based string of characters included in the product image 203, and may include any number of characters, words, phrases, or terms.

In an embodiment, the OCR module 208 may employ a reference source (e.g., a dictionary or other word reference source) (also referred to as an "OCR dictionary") to identify words in the one or more text segments. The OCR dictionary may be employed by the OCR module to identify words in the one or more text segments and determine a closeness or accuracy of the words or terms identified in the text segments to the words or terms in the OCR dictionary. In an embodiment, an extraction confidence score (e.g., a weighted score) may be calculated which represents a comparison of a word or text segment extracted from the product image to a word identified in the OCR dictionary. According to an embodiment, the OCR module 208 is configured to perform feature detection to find distinct blocks, sections, or segments of text within the product image 203. In an embodiment, the output of the OCR module (e.g., the one or more identified text segments) may be in any suitable format (e.g., TXT, JSON and XML format) and maintains the original structure of the data and/or information as it appears on the product's packaging. For example, the extracted text segments relating to "Nutrition Facts" may be structured to match the original structure of the "Nutrition Facts" portion of the product's packaging (e.g., a tabular format with the same fields, information and presentation).

In an embodiment, the OCR module 210 is further configured to calculate and assign a confidence score to the one or more extracted text segments (also referred to as an "extraction confidence score") representing a measure of the confidence associated with the certainty or accuracy of the text segment as extracted from the product image. In an embodiment, the extraction confidence score may include an OCR flag which indicates whether there was an error detected during the OCR scanning of a text segment.

With reference to FIG. 2, the parsing module 212 is a software component or application (e.g., a set of instructions residing in memory, such as memory 110 in FIG. 1) executable by a processing device (e.g., processing device 108 in FIG. 1) configured to receive the output of the OCR module 210 (e.g., the extracted text segment(s)) and parse the output to identify one or more information components. As used herein, an information component may include any character, word, term, phrase, and/or expression representing information, facts and/or attributes associated with the product that are to be displayed to a customer in connection with a catalog entry associated with the product. Exemplary information components may include nutritional facts (e.g., calories, protein, carbohydrates), environmental features (e.g., biodegradable, compostable), specifications, features, requirements, compliance information, and safety information.

According to embodiments, the parsing module 212 is configured to assign a confidence score to each information component (also referred to as the "information confidence score"). In an embodiment, the parsing module 212 may parse the extracted text segment for one or more keywords, attributes, or terms that map to facts or information of interest (e.g., biodegradable, compostable, etc.) identified in a related reference source (e.g., a dictionary or a list of identified keywords). In an embodiment, the parsing module 212 is coupled to a data store (not shown) configured to store a list of keywords or phrases, attributes, or terms that map to information or facts of interest identified in the related reference source. In an embodiment, the parsing module 212 may be configured to use a reference source (e.g., a dictionary or other word reference source) (also referred to as a "parsing dictionary") in order to identify the one or more information components in the one or more extracted text segments. It is noted that the OCR dictionary and the parsing dictionary may be the same reference source or may be different reference sources.

In an embodiment, the parsing module 212 is configured to determine the information confidence score based on the extraction confidence score and a level of interpretation applied to the text during identification of the information component. In an exemplary embodiment, the parsing module 212 may be configured to review every word of a text component to determine if there is an OCR error flag associated with the word. If there is an OCR error flag, the parsing module 212 performs a spell check to generate a list of one or more possible corrections for that word. The parsing module 212 may then check the list against a list of keywords (e.g., previously identified information of interest), and if a match is found, then the level of interpretation needed to identify the match is determined. In an example, the level of interpretation applied to the text during identification of an information component may be determined using a Levenshstein Distance algorithm. In this example, the Levenshstein Distance algorithm may be applied in order to determine a number of edits (e.g., an edit distance) required to change a word or term of a text segment into a keyword or term searched for in a related reference source (e.g., a dictionary or keyword list) by the parsing module 212, in order to identify an information component.

With reference to FIG. 2, the product profile module 214 is a software component or application (e.g., a set of instructions residing in memory, such as memory 110 in FIG. 1) executable by a processing device (e.g., processing device 108 in FIG. 1) configured to receive the one or more information components and associated information (e.g., the information confidence score) from the parsing module 212. The product profile module 214 is configured to compare the information confidence score associated with an information component to a threshold. In an embodiment, if the information confidence score for a particular information component is greater than or equal to the threshold, the product profile module 214 adds the information component to the attribute data store 216.

In an embodiment, the identification of information components and the selection of which information components to include in a product profile and/or attribute data store may be performed asynchronously. In this embodiment, information components and associated information confidence scores may be identified and stored in a data store. Subsequently, the stored information confidence score may be compared to the threshold to determine whether the information component is to be added to a catalog entry associated with the product.

In an embodiment, the product profile module 214 may generate a product profile 218 associated with a particular product which includes the one or more information components identified by the product profile module 214 as satisfying the threshold (e.g., a information component meeting a threshold or standard of accuracy, certainty, and/or confidence). The product profile module 214 may be further configured to discard or throw out any information components having an information component confidence score below the threshold. In this regard, the discarded information components are not added to the attribute data store 216 and/or the product profile 218.

In an embodiment, the attribute data store 216 may be used as source of information when generating product-related catalog entries or any customer-facing description of the product (e.g., a web page including the information components identified by the product profile module 214 for inclusion in the attribute data store 216 and/or the product profile 218.

Figure 3:
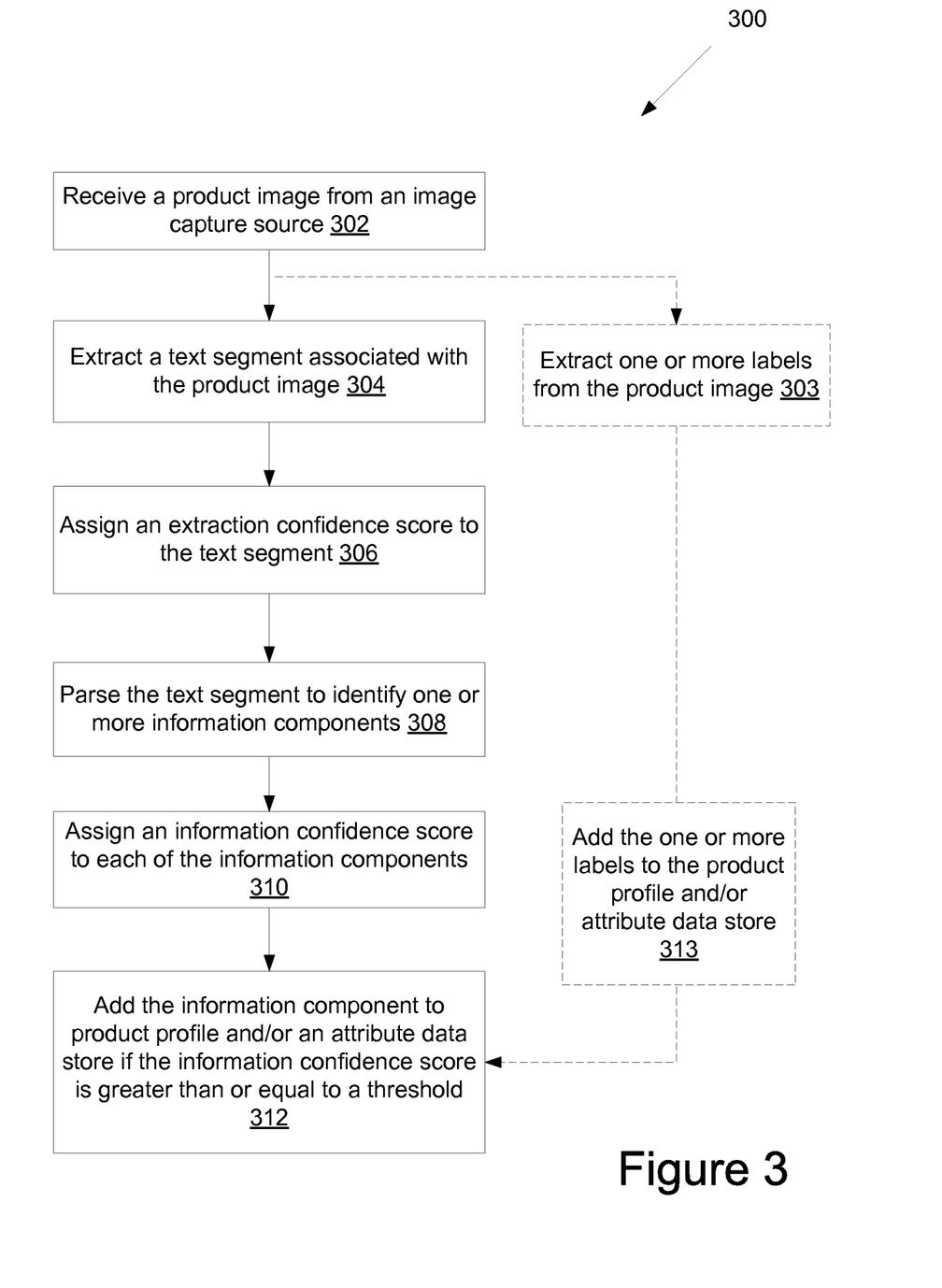
FIG. 3 is a flow diagram of an exemplary method for identifying an information component for inclusion in a product profile and/or attribute data store, according to an embodiment of the present disclosure.

FIG. 3 is a flow diagram of one embodiment of a method 300 for identifying one or more information components associated with a product for inclusion in an attribute data store. The method 300 is performed by processing logic that may comprise hardware (circuitry, dedicated logic, etc.), software (such as is run on a general purpose computer system or a dedicated machine), or a combination of both. In one embodiment, the method is performed by a processing device configured to execute an information extraction module (e.g., the information extraction module 106 of FIG. 1 and/or the information extraction module 206 of FIG. 2).

Referring to FIG. 3, in one embodiment, the method 300 includes receiving a product image an image capture source, in block 302. According to embodiments of the present invention, the product image associated with a product may include multiple individual images, views, or perspectives of the product and the product's packaging (e.g., a six-sided image of the product) and may be in any suitable digital format, such as, for example, JPEG, TIFF, RAW, PNG, GIF, BMP, and the like. The image capture source may be any suitable computing device (e.g., a server computer or a desktop computer), a data store (e.g., a database), imaging device (e.g., a media cart such as a mobile imaging cart, a tilt imaging machine, etc.) and/or image capture device (e.g., a camera) configured to store and/or capture one or more product images. In an exemplary embodiment, the image capture source 102 may be an imaging device located at a product warehouse or fulfillment center.

Optionally (as denoted by the dashed lines), in block 303, one or more labels associated with the product are extracted from the product image. A label may be an identifier (e.g., a graphic, text, image, picture, mark, marking, logo, etc.) representing information associated with the product (e.g., a certification, seal, rating, and/or approval). In an embodiment, in block 303, the product image may be reviewed in accordance with an image matching process in order to identify a potential match between a component of the product image and a stored set of reference labels (e.g., a set of previously identified labels associated with an attribute or other information identified as being of interest in a future presentation of product information to a user/customer).

Optionally, in block 303, a confidence score may be assigned to each of the extracted labels to indicate a certainty of the match between the label identified in the product image and the reference label stored in an associated data store (e.g., the image matching data store 209 in FIG. 2). In an example, the data store may include a reference label such as "EnergyStar" and the product image may be analyzed in order to determine if the label "EnergyStar" is included in the product image. In an embodiment, block 303 may be performed by the image matching module 208 shown in FIG. 2.

In block 304, one or more text segments are extracted from the product image. A text segment refers to any text-based string of characters included in the product image, and may include any number of characters, words, phrases, or terms. In an embodiment, the one or more text segments are extracted using OCR processing. The text segment may be in any suitable format, including, for example, a TXT, JSON or XML file format. In an embodiment, the extracted text segments may be maintained in the original structure of the data as it appears on the product's packaging. For example, the extracted text segments representing the nutrition facts associated with a consumable product may be presented in one object containing the list of information (e.g., nutrition facts such as calories, protein, sodium, etc.) in tabular form.

In an embodiment, a text segment associated with the product image may be extracted according to an OCR process. In an exemplary OCR process, baseline estimation may be performed in order to establish and identify the various "lines" or "segments" of text present in the product image. Having established the baseline estimations, a per-character level review is performed in order to determine the positions of the characters in the one or more text segments. In an embodiment, a horizontal spacing analysis may then be performed to identify the structure of the individual words or terms of the one or more text segments.

In an embodiment, one or more recognition models may be built for use with a well-defined dictionary in order to more accurately search for and identify words in the text segments extracted from the product image. For example, a product image relating to a food product may include a "Sodium 10 mg" text segment. In this example, a recognition model may be built which indicates a probability that a text segment of "Sodium" will appear in the left side of a column on a portion of the product's package and a particular probability may be assigned that the text segment "10 mg" will appear following the "Sodium" text segment. It is noted that in one embodiment, a separate text segment of "10", "mg", and "Sodium" may be identified and extracted and structured in accordance with the original product image. In an embodiment, the "Sodium" text segment and the "10 mg" text segment may be separated by some amount of whitespace. In this example, the OCR processing recognizes that the two text segments are related and combines them into a single information component including "Sodium 10 mg".

In an embodiment, one or more text segments may be extracted from the one or more labels extracted from the product image in block 303. In an exemplary embodiment, the OCR processing may be applied to the extracted labels in order to identify one or more text segments within the labels.

In block 306, the extracted output or text segment may be assigned an extraction confidence score representing a measure of the confidence associated with the certainty or accuracy of the text segment as extracted from the product image. In an embodiment, the extraction confidence score may be assigned for text segment or each individual word in a text segment. For example, an OCR error flag may be associated with a text segment indicating whether there was an error detected during the OCR processing of the text segment. In an embodiment, blocks 304 and 306 may be performed by the OCR module 210 shown in FIG. 2.

In block 308, the one or more extracted text segments are parsed to identify one or more information components. An information component refers to any character, word, term, phrase, and/or expression representing information and/or attributes associated with the product that are to be displayed to a customer in connection with a catalog entry associated with the product. Exemplary information components may include nutritional information (e.g., nutrition facts such as calories, protein, carbohydrates), environmental features (e.g., biodegradable, compostable), specifications, features, requirements, compliance information, and safety information. In an embodiment, a list of particular information (e.g., "facts" or attributes) may be maintained and used during parsing of the text segments in order to identify the one or more information components. For example, a list of facts or attributes relating to the safety of a product may be maintained and cross-referenced in order to determine if any of those safety-related facts appear in the extracted text segments. If so, those facts are identified as information components in block 308.

In block 310, the one or more identified information components are assigned an information confidence score. It is noted that any suitable confidence scoring method may be employed, such as, for example, determining the information confidence score based on the extraction confidence score and a level of interpretation applied to the text segment in order to identify the one or more information components (e.g., the amount of change necessary to a word, term, or phrase identified in a text segment to match a word or term in a related reference source). In an embodiment, each word, term, or phrase of an information component may be reviewed to determine if there is an OCR error flag on the word, term, or phrase. If so, a suitable spell check engine may be employed that generates a list of one or more possible corrections for the particular word, term, or phrase. The generated list is checked against a list of information of interest (e.g., pre-defined facts or attributes of interest). If a match is found, then a level of interpretation needed to match the word, term, or phrase to the fact/attribute on the reference source (e.g., a dictionary or a list of keywords/attributes) is determined. In an embodiment, the level of interpretation may be represented by an edit distance determined in accordance with the Levenshstein Distance method. In an embodiment, blocks 308 and 310 may be performed by the parsing module 212 shown in FIG. 2.

In block 312, each of the identified information components is analyzed to determine whether or not to add those information components to an attribute data store and/or product profile. In an embodiment, the information confidence score and if the associated information confidence score is above a threshold, the information component is added to an attribute data store. If the information confidence score is below the threshold, the information component is discarded and is not added to the attribute data store.

In an embodiment, in block 312, if the same information component is identified multiple times, the information component from that set having the highest information confidence score is added to the attribute data store, and the others are discarded. In another embodiment, different thresholds may be associated with different types or categories of information components. For example, information components have a higher importance or priority may be associated with a higher relative threshold to reflect a tolerance for false positives and/or a certainty/accuracy requirement. In an example, information components relating to government certifications or allergen information may have a higher threshold than non-governmental organization certifications or normal ingredients. In this regard, information components associated with higher thresholds result in a stricter examination of the information component prior to inclusion in the attribute data store and/or product profile.

In an embodiment, a cumulative confidence score may be calculated which includes an aggregate of individual confidence scores associated with multiple instances of a particular information component. For example, there may be ten different instances of the information component "Sodium" in a particular product image. In this example, nine of the instances are associated with an information component of "10 mg", while the tenth instance is associated with an information component of "9 mg". A cumulative confidence score may be calculated which aggregates the confidence scores for the nine instances of the "10 mg" information component. The cumulative score may be compared to the information confidence score for the instance of the "9 mg" information component, and if the cumulative score is higher, the "10 mg" information component may be selected for inclusion in a product profile and/or the attribute data store, while the "9 mg" information component may be discarded.

In another embodiment, the information confidence score may be based in part on other supporting information (e.g., a title of the product, which is designated and provided by the vendor) for the purposes of determining a final information confidence score. In an embodiment, an information confidence score which fails to satisfy a given threshold, but falls within an expectable range, may be re-considered in view of the supporting information to determine if the supporting information can give the information confidence score a "boost" above the threshold. For example, assume there is an information confidence score associated with an information component of "organic" is 95%, but the associated threshold is 96%. Rather than discarding this information component, the supporting information, such as the title of the product may be considered. In this example, if the title of the product includes the term "organic", then the information confidence score associated with the "organic" information component may be given a boost of some pre-determined amount. In this example, if the boost associated with the supporting information is 1% or more, then the "information confidence score associated with the "organic" information component may be raised above the threshold and added to the attribute data store.

With reference to block 312, in an alternative embodiment, the information component may be added along with its associated information confidence score to the attribute data store. In this embodiment, the comparison of the information confidence score to a threshold may be performed following the addition of the information component to the attribute data store and/or an associated catalog (e.g., the threshold may be applied to the information component and its associated information confidence score after it has been added to the catalog). In this regard, it is noted that the comparison to the threshold may be performed before adding the information component to the attribute data store and/or the associated catalog (as shown in block 312 of FIG. 3) or after the information component is added to the attribute data store and/or the associated catalog (not shown).

In an embodiment, the information component may be included with its associated information confidence score in the catalog for review by a user (e.g., a customer). In this embodiment, a customer may view and consider the information component and its associated information confidence score and make his or her own assessment regarding the accuracy or correctness of the underlying information about the product. In an embodiment, a determination may be made whether or not to display an information confidence score with a particular product or information component in a catalog and/or to a customer. For example, the determination may be based on the type of product or other suitable criteria.

In an embodiment, in block 313, any labels extracted in block 303 may be added to the attribute data store in association with the product and/or the product profile. In this embodiment, the attribute data store may include a record associated with a product including the information components and one or more labels associated with the product. The attribute data store and/or product profile may be used in a subsequent process to populate, generate, produce and/or display product information to a customer. For example, the information stored in the attribute data store may be used to populate a catalog entry associated with a product and displayed to a customer via an e-commerce website. In an embodiment, blocks 312 and 313 may be performed by the product profile module 214 shown in FIG. 2. In an embodiment, a marketplace may be established for the exchange of the information components added to the attribute data store (e.g., the information components associated with a product may be sold in the marketplace).

Figure 4:
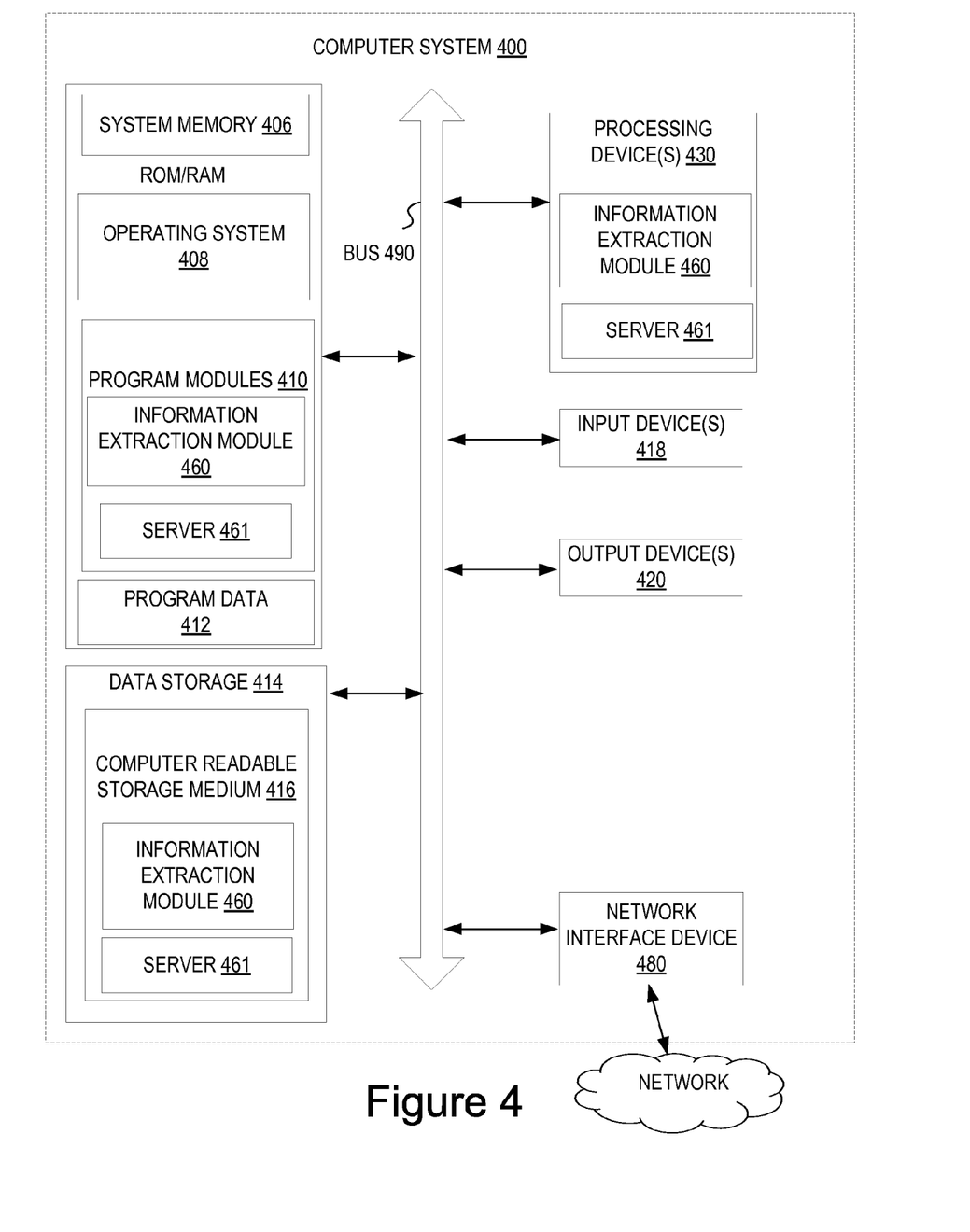
FIG. 4 illustrates an exemplary computing system, according to an embodiment of the present disclosure.

FIG. 4 is a block diagram illustrating an exemplary computer system 400 configured to perform any one or more of the methodologies performed herein. Computer system 400 may be any type of computing device such as an electronic book reader, a PDA, a mobile phone, a laptop computer, a portable media player, a tablet computer, a camera, a video camera, a netbook, a desktop computer, a gaming console, a DVD player, a television, a computing pad, a media center, a rackmount server, a desktop computer, a network router, switch or bridge, or any other computing device. In one embodiment, the computer system 400 corresponds to a machine of the computing system 104 of FIG. 1.

The computer system 400 may operate in the capacity of a server or a client machine in client-server network environment, or as a peer machine in a peer-to-peer (or distributed) network environment. Further, while only a single machine is illustrated, the computer system 400 shall also be taken to include any collection of machines that individually or jointly execute a set (or multiple sets) of instructions to perform any one or more of the methodologies discussed herein.

The computer system 400 includes one or more processing devices 430, which may include general-purpose processing devices such as central processing units (CPUs), microcontrollers, microprocessors, systems on a chip (SoC), or the like. The processing devices 430 may further include dedicated chipsets, application specific integrated circuits (ASIC), field programmable gate arrays (FPGA), digital signal processors (DSP), network processors, or the like. The user device 400 also includes system memory 406, which may correspond to any combination of volatile and/or non-volatile storage mechanisms. The system memory 406 stores information which may provide an operating system component 408, various program modules 410 such as information extraction module 460 and server 461 (which may correspond to information extraction module 106 or 206 and computing system 104, respectively), program data 412, and/or other components. The computer system 400 may perform functions by using the processing device(s) 430 to execute instructions provided by the system memory 406. Such instructions may be provided as software or firmware. Alternatively, or additionally, the processing device(s) 430 may include hardwired instruction sets. The processing device 430, system memory 406 and additional components may communicate via a bus 490.

The computer system 400 may also include a data storage device 414 that may be composed of one or more types of removable storage and/or one or more types of non-removable storage. The data storage device 414 includes a computer-readable storage medium 416 on which is stored one or more sets of instructions embodying any one or more of the methodologies or functions described herein. As shown, instructions for an information extraction module 460 and/or server 461 may reside, completely or at least partially, within the computer readable storage medium 416, system memory 406 and/or within the processing device(s) 430 during execution thereof by the computer system 400, the system memory 406 and the processing device(s) 430 also constituting computer-readable media. Additionally, instructions for a streaming client (not shown) may reside in the computer readable storage medium, system memory 406 and/or processing devices 430.

While the computer-readable storage medium 416 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The user device 400 may also include one or more input devices 418 (keyboard, mouse device, specialized selection keys, etc.) and one or more output devices 420 (displays, printers, audio output mechanisms, etc.). Computer system 400 may additionally include a network interface device 480 such as a network interface card (NIC) or wireless modem to connect to a network. The network interface device 480 may provide network connectivity using any type of wired or wireless network technology including, for example, Ethernet, Firewire, universal serial bus (USB), Thunderbolt, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed down-link packet access (HSDPA), WiFi, long term evolution (LTE), worldwide interoperability for microwave access (WiMAX), etc.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "extracting", "assigning", "parsing", "adding" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of a computing system, an image of a product label presented in one or more views of a product packaging associated with a product, wherein the product label comprises at least one of a graphic, text, image, picture, mark, marking or logo on the product packaging;
extracting, by the processing device from the image of the product label, product information indicative of one or more attributes of the product;
determining, by the processing device, an information confidence score associated with the product information based at least in part on comparing the product information and a stored list of keywords;
adding, by the processing device, the product information to a product profile after determining the information confidence score associated with the product information is greater than or equal to a threshold; and
sending the product profile to be stored in an attribute data store used to populate a webpage associated with the product to be displayed to a customer via an e-commerce website, wherein the e-commerce website enables the customer to purchase the product.

2. The method of claim 1, further comprising:
extracting one or more labels included in the image, the extracting based at least in part on comparing data in the image against one or more reference labels stored in an image matching data store by matching data embedded in the image to one or more images stored in the image matching data store; and
adding the one or more labels to the product profile.

3. The method of claim 1, further comprising extracting one or more text segments from the image using optical character recognition processing.

4. The method of claim 3, wherein the product information is identified based on a keyword search of the one or more text segments.

5. The method of claim 1, wherein the threshold is selected based on a product type associated with the product from a plurality of thresholds associated with a plurality of product types.

6. The method of claim 1, wherein the product information represents at least one of a certification or a fact associated with the product.

7. A non-transitory computer readable medium having instructions that, when executed by a processing device, cause the processing device to perform operations comprising:
receiving, by the processing device, an image of a product label presented in one or more views of a product packaging associated with a product, wherein the product label comprises at least one of a graphic, text, image, picture, mark, marking or logo on the product packaging;
extracting, by the processing device, from the image of the product label, product information indicative of one or more attributes of the product;
determining, by the processing device, an information confidence score associated with the product information based at least in part on comparing the product information and a stored list of keywords;
adding, by the processing device, the product information to a product profile after determining the information confidence score associated with the product information is greater than or equal to a threshold; and
sending the product profile to be stored in an attribute data store used to populate a webpage associated with the product to be displayed to a customer via an e-commerce website, wherein the e-commerce website enables the customer to purchase the product.

8. The non-transitory computer readable medium of claim 7, wherein the operations further comprise:
extracting one or more labels included in the image, the extracting based at least in part on comparing data in the image against one or more reference labels stored in an image matching data store by matching data embedded in the image to one or more images stored in the image matching data store; and
adding the one or more labels to the product profile.

9. The non-transitory computer readable medium of claim 7, wherein the operations further comprise extracting one or more text segments from the image using optical character recognition processing.

10. The non-transitory computer readable medium of claim 9, wherein the product information is identified based on a keyword search of the one or more text segments.

11. The non-transitory computer readable medium of claim 7, wherein the threshold is selected based on a product type associated with the product from a plurality of thresholds associated with a plurality of product types.

12. The non-transitory computer readable medium of claim 7, wherein the product information represents at least one of a certification or a fact associated with the product.

13. A computing system comprising:
a memory to store instructions; and
a processing device, coupled to the memory, wherein the processing device is configured to execute the instructions to cause the processing device to:
receive an image of a product label presented in one or more views of a product packaging associated with a product, wherein the product label comprises at least one of a graphic, text, image, picture, mark, marking or logo on the product packaging;
extract from the image of the product label, product information indicative of one or more attributes of the product;
determine an information confidence score associated with the information component based at least in part on comparing the information component and a stored list of keywords;
add the product information to a product profile after determining the information confidence score associated with the product information is greater than or equal to a threshold; and
send the product profile to be stored in an attribute data store used to populate a webpage associated with the product to be displayed to a customer via an e-commerce website, wherein the e-commerce website enables the customer to purchase the product.

14. The computing system of claim 13, wherein the processing device to:
extract one or more labels included in the image, the extracting based at least in part on comparing data in the image against one or more reference labels stored in an image matching data store by matching data embedded in the image to one or more images stored in the image matching data store; and
add the one or more labels to the product profile.

15. The computer system of claim 13, the processing device to extract one or more text segments from the image using optical character recognition processing.

16. The computing system of claim 15, wherein the product information is identified based on a keyword search of the one or more text segments.

17. The computing system of claim 13, wherein the threshold is selected based on a product type associated with the product from a plurality of thresholds associated with a plurality of product types.

18. The computing system of claim 13, wherein the product information represents at least one of a certification or a fact associated with the product.

\* \* \* \* \*